United States Patent

[11] 3,534,811

| [72] | Inventor | Dieter R. Walz |
| | | Portola Valley, California |
| [21] | Appl. No. | 784,738 |
| [22] | Filed | Dec. 18, 1968 |
| [45] | Patented | Oct. 20, 1970 |
| [73] | Assignee | The United States of America, as represented by the United States Atomic Energy Commission |

[54] BALL-LOADED HIGH ENERGY PARTICLE BEAM DUMP
5 Claims, 2 Drawing Figs.

[52] U.S. Cl. .................................................. 165/47, 250/49.5, 250/89, 250/108
[51] Int. Cl. ........................................................ G21f 1/00
[50] Field of Search............................................ 165/47; 250/108; 328/Consulted; 250/49.5, 89

[56] References Cited
UNITED STATES PATENTS

| 2,853,624 | 9/1958 | Wigner et al. ............... | 250/108X |
| 2,910,593 | 10/1959 | Laing et al. .................. | 250/108X |
| 3,256,442 | 6/1966 | Sedlak........................... | 250/108 |
| 3,315,732 | 4/1967 | Garwin et al. ................ | 165/47 |

Primary Examiner—Albert W. Davis, Jr.
Attorney—Roland A. Anderson

ABSTRACT: A beam dump comprised of a tank loaded with small solid aluminum balls in point-to-point contact for stopping a high-energy particle beam and for dissipating the beam energy to cooling water flowing through the tank.

Patented Oct. 20, 1970
3,534,811
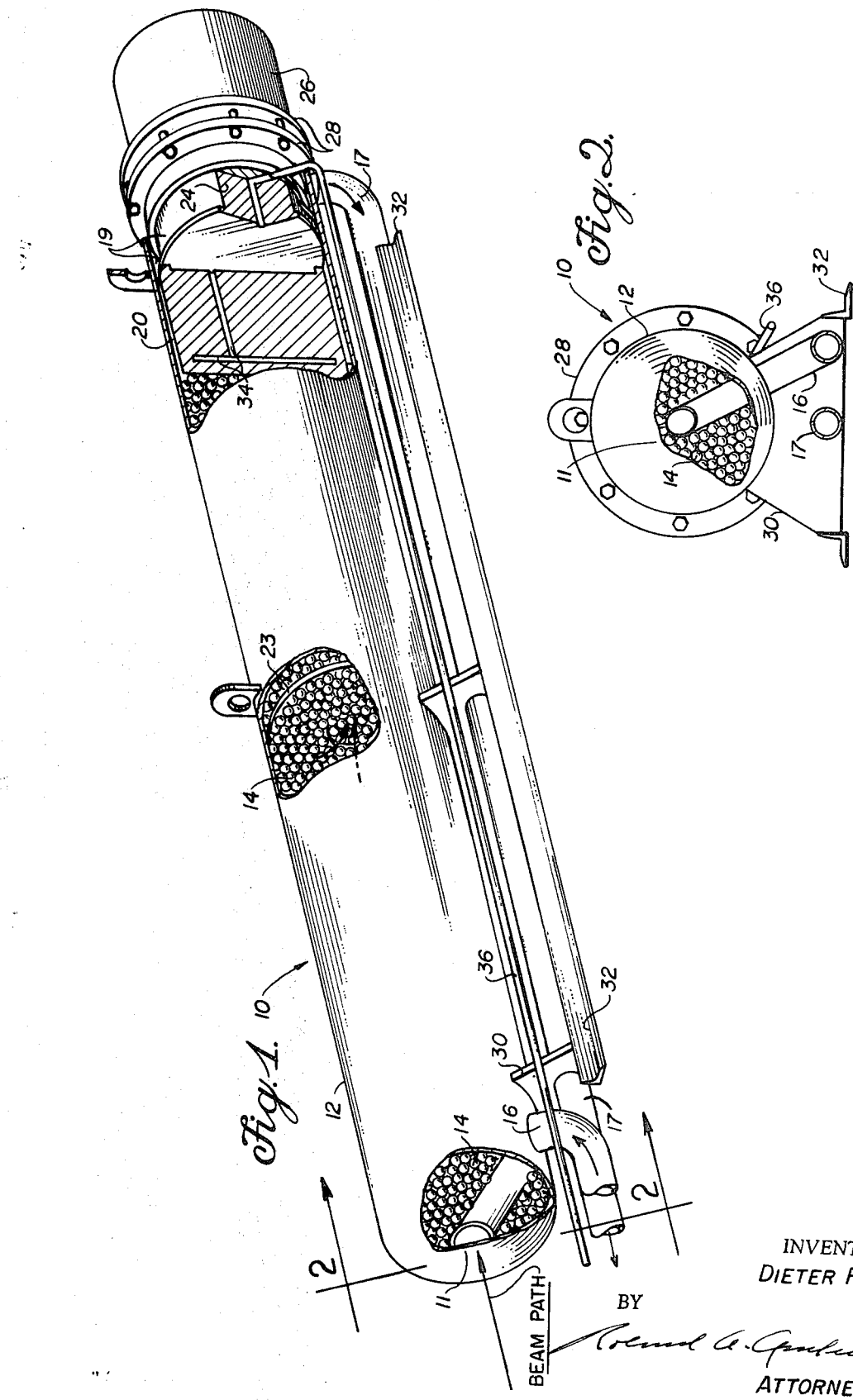
INVENTOR.
DIETER R. WALZ
BY
ATTORNEY 3,534,811

BALL-LOADED HIGH ENERGY PARTICLE BEAM DUMP

The invention disclosed herein was made under, or in, the course of Contract No. AT (04-3)-400 with the United States Atomic Energy Commission.

BACKGROUND OF THE INVENTION

The present invention relates to a beam dump for a high-energy particle beam, and more particularly, it pertains to a beam dump packed with small balls for absorbing and dissipating the beam energy.

In prior beam dumps for use with high-energy particle beams, various types of complex cooling systems have been used for dissipating large amounts of energy deposited in a dump. These prior dumps, however, are bulky and are expensive in that they require precision machining operations and difficult assembly procedures.

SUMMARY OF THE INVENTION

In brief, the invention pertains to a beam dump comprised of a container loaded with balls for stopping a high-energy particle beam. For convenience, the balls may be formed to approximate a sphere. The geometry of a sphere is unique in having the largest volume to surface area ratio of any simple geometrical body. This ratio gives a sphere optimal power absorption characteristics for a particular material over any other geometrical shape of the same material. Furthermore, the spheres in a bed of spheres are never in more than point contact with neighboring spheres, thus nearly the total surface area of a sphere is available for heat transfer. A bed of spheres also constitutes a compact porous volume of beam stopping material through which a coolant may be uniformly circulated for effective heat transfer. Still another advantage of a spherical shape for the beam stopping material is that heat flux paths in a sphere are all essentially radial; and as heat flux increases as a function of the radius from the center of a sphere to its surface, assuming uniformly distributed heat sources, the heat flow area increases also. This keeps temperature gradients, and therefore thermal stresses, in the material, low. Moreover, a sphere cooled on the outside surface has its highest temperature and stress at its center which is fully restrained by the colder material close to the surface. A sphere therefore can withstand, without damage, thermal stresses that are in excess of the yield strength of the sphere material. Furthermore, spherically-shaped balls are easily made, they do not require precision machining, and they readily conform to the container in which they are packed. A ball-loaded beam dump, therefore, is simple and inexpensive to construct and may be easily adapted to be of any desired size, especially a compact size that is portable. Moreover, the beam attenuation in a ball-loaded dump is effective in both axial and radial directions; and since the balls undergo a minimum of thermal stress, they provide a reliable, long lasting, and effective means for stopping a high-energy particle beam.

An object of the invention is to stop a high-energy particle beam and dissipate the beam energy with a beam dump that is simple, inexpensive, compact, reliable, long lasting and effective.

Another object is to provide a high-energy beam dump comprised of a container loaded with balls of beam stopping material that is uniformly exposed to a coolant circulated through the dump.

Another object is to stop a high-energy particle beam without damage to the beam stopping material.

Other objects and advantageous features of the invention will be apparent in a description of a specific embodiment thereof, given by way of example only, to enable one skilled in the art to readily practice the invention, and described hereinafter with reference to the accompanying drawing.

BRIEF DESCRIPTION OF THE DRAWING

FIG. 1 is a view with portions broken away of a ball-loaded beam dump according to the invention.

FIG. 2 is a view of the beam dump of FIG. 1 taken in the direction of lines 2-2, with a central portion broken away.

DESCRIPTION OF AN EMBODIMENT

Referring to the drawing, there is shown in FIG. 1 a beam dump 10 with its central axis aligned with a high-energy particle beam path. The dump 10 is comprised of a tank 12 having a dished end 11 that is incident to the beam path and acts as a beam window. The tank is filled with balls 14 of beam stopping material which should have a low atomic number Z to prevent high concentrations of heat generation and consequent destruction of the material in the presence of a high-energy particle beam. The balls 14 are tightly packed in the tank 12 to provide a large mass of beam stopping material that also provides passages through which a coolant may be circulated.

A coolant, such as water, may be introduced into the tank 12 at the incident beam end 11 through a conduit 16 which extends through the tank wall and the interior of the tank to the point of incidence of the beam path. The coolant is removed from the tank 12 through a conduit 17 which communicates with an annular chamber 19 that connects through a passage 20 with the tank space filled with the balls 12.

Cooling of the central volume of the tank, which during operation of the beam dump will have the greatest concentration of heat flux, may be enhanced by mounting one or more water flow diverters 23 in the tank to reduce peripheral water flow. The diverter 23 may conveniently be a solid disc having a central hole axially aligned with the central axis of the tank 12 for directing flow of water from the peripheral regions of the tank to a path along the central axis of the tank where the greatest amount of beam energy is deposited.

Three blocks 24 of a low Z material such as aluminum are mounted at the terminal end of the tank 12. The beam energy at the terminal end of the tank is sufficiently attenuated after passing through the balls 14 that the solid blocks 24 may be used for further beam attenuation without destroying the blocks. These blocks are peripherially cooled by passage of the coolant into and through the passage 20 leading to the annular chamber 19 and to the outlet conduit 17.

Final beam cleanup is accomplished with a solid block 26 of medium or high Z material such as copper or tungsten. The block 26 is tightly held to the blocks 24 by means of flanges 28. An efficient thermal joint for conduction of heat from the block 26 to the blocks 24 and hence to the coolant circulating around the blocks 24 may be made with concentric rings in the end of one of the blocks for deforming a weak metal gasket between the blocks.

The tank 12 may conveniently be mounted on several plates 30 that are suitably attached to a portion of the circumference of the tank and by angle beams 32 that are suitably attached to the plates 30.

In operation, a high-energy particle beam enters the dump at the dished incident end 11, passes through the ball-loaded portion of the dump where it is attenuated sufficiently for further absorption in the solid blocks 24. The blocks 24 attenuate the beam to the point that it is completely stopped by the block 26.

As a safety precaution for indication of burnout of the beam stopping material, vacuum passages 34 are provided in the aluminum blocks 24. These passages may be connected over a vacuum line 36 to a vacuum system in which the loss of a vacuum would immediately shut off the high-energy beam, such as the beam transport vacuum system of a high-energy accelerator. Thus, in the event that the coolant flow is stopped or too much beam power is being deposited in the dump, the balls would either melt or vaporize. The deposition of the beam energy would shift downstream toward the blocks 24, eventually burning a hole in the blocks and allowing the coolant to be forced into the vacuum passages 34. This condition would become immediately apparent in a pressure rise in the vacuum system, causing it to shut off the beam.

A device exemplifying the invention was constructed with an aluminum tube having an inside diameter of 25 centimeters and a length of 160 centimeters. The tube was filled with 1 centimeter diameter aluminum balls, a 38 centimeter long aluminum block was mounted in the terminal end of the tube, and a 33 centimeter long copper block was mounted adjacent the aluminum block. The dished incident end of the aluminum tube was formed from 0.75 centimeter thick aluminum to act as a window. The constructed device was found to effectively dissipate average beam power up to 500 kw. when water was supplied to the dump at the rate of 66 gallons per minute.

While an embodiment of the invention has been shown and described, further embodiments or combinations of those described herein will be apparent to those skilled in the art without departing from the spirit of the invention or from the scope of the appended claims.

I claim:

1. A beam dump for stopping a high-energy particle beam, comprising:
   a. an elongated container having a first end and a second end;
   b. a plurality of balls of beam energy absorbing material packed in said container, a portion of said plurality of balls being substantially centrally located in said container in point-to-point contact from said first end to said second end;
   c. means for supplying a coolant to flow into said container at said first end;
   d. means for removing said coolant at said second end; and
   e. means mounted in said container for directing the greatest flow of coolant to be over the centrally located balls between said first and second ends.

2. The beam dump of claim 1 further including a first solid block of beam-stopping material at said second end of said container.

3. The beam dump of claim 2 wherein said first solid block of beam-stopping material has a first atomic number and further including a second solid block of beam-stopping material between said first block and said second end, said second block having an atomic number higher than said first block.

4. The beam dump of claim 2 wherein said first solid block is formed with a vacuum chamber, said chamber communicating with passages for connection to a vacuum system for transmitting an increased pressure to said system upon burnout of said block whereby said vacuum chamber communicates with the container space filled with said balls.

5. The beam dump of claim 1 wherein said container is a cylindrical tank and said first end is dished, said supplying means conducts said coolant over the interior surface of said dished end, and said means mounted in said container is comprised of at least one diversion plate transversely mounted in said cylindrical tank intermediate said first and second ends, said plate having a central passage having a diameter larger than the diameter of said balls, said passage being axially aligned with said cylindrical tank for blocking continuous peripheral coolant flow and concentrating the flow of coolant along the central axis of the tank.